US007401732B2

(12) United States Patent
Haddad

(10) Patent No.: US 7,401,732 B2

(45) Date of Patent: Jul. 22, 2008

(54) APPARATUS FOR READING STANDARDIZED PERSONAL IDENTIFICATION CREDENTIALS FOR INTEGRATION WITH AUTOMATED ACCESS CONTROL SYSTEMS

(76) Inventor: Michael A. Haddad, 18945 Cross Country Lane, Gaithersburg, MD (US) 20879

( * ) Notice: Subject to any disclaimer, the term of this patent is extended or adjusted under 35 U.S.C. 154(b) by 385 days.

(21) Appl. No.: 11/220,282

(22) Filed: Sep. 7, 2005

(65) Prior Publication Data

US 2006/0000901 A1 Jan. 5, 2006

Related U.S. Application Data

(63) Continuation-in-part of application No. 10/330,981, filed on Dec. 30, 2002, now abandoned.

(51) Int. Cl.
*G06K 5/00* (2006.01)

(52) U.S. Cl. ........................ 235/380; 235/382; 235/384

(58) Field of Classification Search ................. 235/380, 235/382, 375, 384
See application file for complete search history.

(56) References Cited

U.S. PATENT DOCUMENTS 5,489,773 A * 2/1996 Kumar ....................... 235/380
5,818,023 A * 10/1998 Meyerson et al. ........... 235/470
6,382,506 B1 * 5/2002 Van Der Valk .............. 235/380
6,394,356 B1 * 5/2002 Zagami ....................... 235/487
7,136,512 B2 * 11/2006 Burns ......................... 382/118
7,137,553 B2 * 11/2006 Register et al. .......... 235/382.5
2004/0169076 A1 * 9/2004 Beale et al. ................. 235/382
2005/0284931 A1 * 12/2005 Adams et al. ............... 235/382

* cited by examiner

*Primary Examiner*—Ahshik Kim

(57) ABSTRACT

An apparatus for reading information encoded on standardized personal identification credentials includes a reading device that reads information encoded on 3-track magnetic stripes as well as barcodes, and connects to a computer system to allow complete automation of information collection. The software application uses the apparatus to automate the collection of data from individuals entering a secure facility, and includes a credentialing for recognizing employees, contractors and visitors. The software system allows for visitor pre-announcement, specification of visit duration, and printing of time-sensitive access passes. The software application supports an unlimited number of printers. Security is enhanced through an automatic checking of government supplied terrorists lists, and other ENTRY NOT ALLOWED lists. The software application encrypts important visitor personal data for privacy purposes, and includes a device for customizing system security and data collection. The software application includes reporting, and data exporting utilities.

4 Claims, 11 Drawing Sheets

Components Platform

Housing and components platform assembly

Top View

Automated Entry/Exit Access Control System Building Block

US Immigration and Naturalization Services entry form - I94

APPARATUS FOR READING STANDARDIZED PERSONAL IDENTIFICATION CREDENTIALS FOR INTEGRATION WITH AUTOMATED ACCESS CONTROL SYSTEMS

CROSS-REFERENCE TO RELATED APPLICATIONS

This application is in continuation in part of application Ser. No. 10/330,981 filed on Dec. 30, 2002 now abandoned.

FIELD OF THE INVENTION

The invention relates to a device for recovering information from standardized personal identification credentials using a specified structural design. Such device is capable of downloading information to a central processing unit.

The invention also relates to the field of access control systems, using the device of this invention, to automate data collection at entry/exit portals and cause the printing of a reliable security pass.

DESCRIPTION OF PRIOR ART

The basis for recovery of critical information from drivers' licenses has been addressed, by Messina and Cohen, U.S. Pat. No. 5,864,623, Authentication System For Driver Licenses, which embodies a programmable apparatus to authenticate the contents of drivers' licenses having both human recognizable information and machine-readable information.

As taught by Messina and Cohen, authentication may use a magnetic stripe reader device, a bar code scanner device, and a digital scanner device to feed information to a central processing unit.

Said apparatus of Messina and Cohen uses separate devices to read each category of information stored on a given type of standardized personal identification credential. That is, separate devices are required for recovering information from barcodes, as opposed to magnetic stripes, or optical scanning. Furthermore, such an approach requires significant event-specific intervention by the user.

The bar code scanner of Messina and Cohen, is manually triggered in order to produce a reading. The bar code scanner must be pointed to the barcode media, brought back and forth until a barcode reading is finally successful. Furthermore, the information collected is limited to authenticating the drivers' license, and is not immediately compatible with comparative tests against additional databases.

A basis for automated information recovery from standardized drivers' licenses and subsequently using such information for automated decision-making has been disclosed by Sharrard, U.S. Pat. No. 5,722,526, Dispensing Security System For A Vending Machine, which claims a security system for controlling the dispensing of products subject to verification of customer age from a vending machine. Such age-restricted products include cigarettes and alcoholic beverages. Sharrard teaches use of a small computing unit that reads the customer's date of birth (DOB) from the drivers' license, calculates customer age based on current date, and compares that age to the predetermined age limit. The product is then either dispensed or the transaction is terminated in accordance with the age restriction.

One basis for providing an access control system has been addressed by Zagami, U.S. Pat. No. 6,394,356 B1, Access Control System. Operation of the Zagami access control system provides a visitor access solution that is operator-intensive, requiring manual entry using a keyboard/touch screen 16 or magnetic strip reader of claim 28 (without acknowledging any use of this latest entry means); manual acquisition of a person digital image 14*a*, acquisition of a digital image of the identification document 14*b*, issuance of a visitor pass 28, which includes an image of the visitor combined with an image of the identification document. Visitor pass issued by this system can be used to record the time at exit by reading a machine-readable media printed on the pass. The pass is a one-time use only and does not support multiple entries for multiple days while the pass may be assumed valid. In Fact, the date and time of entry of the individual information printed and the coded representation of the arrival date and time is also encoded on the access pass 70 to prevent unauthorized re-use of the pass. As such, pass issued by Zagami' system is not time sensitive and does not have any time relation other then to an exit time record. As per claim 19, machine-readable media processing means is further operable to perform the steps of recording a time of exit of the person and storing said time of exit in said tracking record. As such, Zagami does not claim allowing multiple entry/exit during valid period (no mention of valid period and its description in Zagami patent), using the same pass. Therefore, Zagami' system does not have any mention of re-using pass for re-entry, or using the machine-readable media on the pass to collect and record time of re-entry, or time of re-exit for an unlimited number of entry/exit while the pass is assumed valid within an allocated duration of a visit. Pass issued by Zagami system serves as an internal location tracking method, which is not a claim of this patent application.

Furthermore, the Zagami approach fails to exploit the full potential of automated data entry. Zagami claims using a drivers' license, a business card, or a passport as identification documents (claim 26, 27, 46, 47 & 48). Zagami does not claim reading encoding available on the drivers license, therefore, identification documents used by Zagami system are at most scanned (business cards and passports do not hold any barcode or mag strip media) and OCR (Optical Character Recognition) is performed to obtain the name of the person (claims 33 & 44). With Zagami system, individual information collected from a passport is entered manually into the system. The process of scanning and OCR'ing passports is very limited since passports do not follow any international standards, in language and forms, worldwide. This patent application solves the passport standardization problem by using I94 US Immigration and Naturalization document, as a means of identification for all foreign visitors entering the US territories.

By saving the identification document image in a computerized system and printing it on the issued pass, Zagami' approach fails to protect individual information, privacy and therefore, results in a security breach.

One basis for automating bar code symbol reading has been addressed by Rockstein et al., U.S. Pat. No. 5,260,553, Automatic Hand-Supportable Laser Bar Code Symbol Scanner And Method of reading Bar Code Symbols Using The Same, which embodies electronic components for carrying out object detection. On the other hand, the device presented in this patent application provides means of detecting a bar code presence at the top window using an always-on low-powered light beam, rather than components included in Rockstein et al. patent.

One basis for producing a personal ID card has been addressed by Belucci et al., U.S. Pat. No. 5,913,542, System For Producing A Personal ID Card, which comprises a system for producing an identification instrument that includes both human-recognizable and machine-readable indicia. The system is totally manual (FIG. 2A) and its purpose is only to create identification cards such as employee ID and therefore does not relate to the goal of this patent application, which is related to the in the access control field and associated automation methods.

One basis for enhancing photographic identification documents has been addressed by Rhoads, U.S. Pat. No. 5,841,886, Security System for Photographic Identification, which embeds within the photographic image encoded information that may be correlated to other information pertaining to the individual represented by the image. This present patent application is not about individual image recognition or analysis and therefore Rhoads patent has no direct relation with this application claims.

One basis for producing and authenticating an identification card has been addressed by Marcus, U.S. Pat. No. 5,864,622, Secure Identification Card And Method And Apparatus For Producing And Authenticating Same, which comprises a system for producing and authenticating identification cards. The present patent application relates to using identification cards to produce temporary entry/exit passes rather than producing permanent identification cards and authenticating them.

One basis for electronically capturing the image of one or more persons and/or objects, associating such image(s) with a database record has been addressed by Zagami, U.S. Pat. No. 6,801,907, System For Verification And Association Of Documents And Digital Images, which comprises a process and apparatus, using a computer system, peripheral equipment, and uniquely designed software. This system used primarily on cruise ships and the like is used to match an individual' ID information with an existing prepaid customer database. Once a pass is issued to a customer, it is used to track customer transactions within a commercial environment such as a ship. This patent is not related to security and its purpose is merely customer management and commercial transactions tracking.

DESCRIPTION OF PRIOR ART

The basis for ID card verification apparatus has been addressed by Meyerson et al. (U.S. Pat. No. 5,818,023). A portable ID Card verification apparatus is disclosed. The apparatus includes a housing defining an interior region supporting electrical circuitry including a processor. A two dimensional imaging assembly is at least partially enclosed within the housing. A display screen is electrically coupled to the imaging assembly. An upper surface of the housing supports a glass window on which an ID card is positioned for reading a dataform imprinted thereon. The dataform includes a compressed digitized representation of an attribute of the authorized card holder, such as a photograph of the card holder. The imaging assembly images and decodes the 2D dataform on the ID card and the processor in conjunction with display driver circuitry causes an image of the card holder's photograph to be displayed on the display screen.

Furthermore, Meyerson claims the following:

1. A portable verification apparatus for reading a dataform imprinted on an ID card, the dataform including an encoded, digitized representation of an attribute of an authorized user of the card, the apparatus comprising:
   a housing defining an interior region and supporting electronic circuitry including a processor; a substantially transparent window supported by the housing and being accessible from an exterior of the housing, the window providing a support surface upon which the ID card is placed, the card's dataform being visible through the window; an imaging assembly coupled to the electronic circuitry and including a camera assembly including a 2D photosenstor array supported within the housing and an optics assembly spaced from the 2D photosensor array to focus an image of the dataform onto the 2D photosensor array; d) decoding circuitry for decoding the dataform imaged onto the photosensor array; a display screen electrically coupled to the electronic circuitry for displaying a decoded representation of the attribute of the authorized user of the card; and a mirror positioned between the substantially transparent window and the optics assembly and the optics assembly being positioned such that a longitudinal axis bisecting a field of view of the optics assembly is substantially parallel to a plane defined by a support surface of the substantially transparent window, wherein the 2D photosensor array and the optics assembly are supported by a movable support which is selectively movable along the longitudinal axis of the optics assembly and along two other axis which are both substantially normal to the longitudinal axis, wherein the optics assembly includes an outer housing which is threaded into a support shroud overlying the 2D photosensor array, the optics assembly being movable with respect to the photosensor array by rotating the optics assembly housing with respect to the support shroud, wherein the apparatus further includes focusing circuitry which displays the dataform on the display screen and illuminates a user visible indicator signal on the display screen indicating a sharper image if a user is rotating the optics assembly housing in a direction that improves a resolution of the image of the dataform onto the 2D photosensor array and illuminates a user visible indicator signal on the display screen indicated a worse image if a user is rotating the optics assembly housing in a direction that reduces the resolution of the image of the dataform onto the 2D photosensor array.

Meyerson claims a verification apparatus in an effort to reduce unauthorized use of lost or stolen identification cards (ID cards) such as driver's licenses, credit cards, automatic teller bank cards. To support the verification effort, Meyerson suggests a possible solution to this problem which would be to imprint a dataform on a surface of an ID card wherein the dataform includes an encoded digitized representation of the card holder's photograph. When the ID card is presented to an attendant for use, the dataform imprinted on the ID card would be decoded and an image of the card holder displayed on a display screen. The attendant would compare the display with the photograph on the front of the ID card to verify that the ID card has not been modified.

Major differentiation exists between Meyerson's apparatus and the apparatus claimed in this patent application:

Meyerson's device design requires a camera assembly, a 2D photosensor array, an optics assembly, a flat top window, a display screen, a mirroring assembly, a movable support requiring a longitudinal axis, an outer housing which is threaded into a support shroud, an optics rotating assembly, a focusing circuitry, a user visible indicator signal to manually and cautiously improve the image resolution of the dataform.

The apparatus of this invention includes only a fixed 2D imaging assembly, an angled window, an ID/object detector, and a 3-track magstnpe reader, all components mounted in a housing specifically designed to provide an optimal and always focused reading requiring no manual operations, said apparatus does not require any movement, rotation or any component at any time, does not include mirroring, focusing circuitry, display screen, movable support, longitudinal axis, support shroud, an optics rotating assembly, or user visible indicator to improve the image resolution. Meyerson's Imaging device is movable while the apparatus imaging device of this invention is in a fixed position at a fixed distance from the upper opening window. This distance plays an important design factor whereas the imaging device is able to perform all reading without any movement;

Meyerson's does not claim recovering information from standardized personal identification, but only from non-standard encoded data form, specifically imprinted for this purpose, that is, an encoded digitized representation of the card holder's photograph on a card. Meyerson's apparatus is not capable of recovering information from standardized personal identification credentials, such as magnetically encoded medias, whereas this application apparatus recovers information from standardized personal identification credentials;

Meyerson's apparatus analyzes credentials imprinted and encoded features to verify credentials validity while this invention claims an apparatus providing a solution to instantly recover information from standardized encoded credentials. An important factor of this application apparatus is the speed and easiness of recovering credentials information, without requiring any manual movement of the device, all is required, is to swipe a credential or approach a credential to the top window. Meyerson discloses further a flat top window with mirroring mechanism inside the device; the apparatus of this invention provides a top angled window at an optimized angle to make the reading always focused and avoid the imaging component emitted light to be reflected back to the imaging component, without moving the imaging device as required in Meyerson device. The apparatus of this invention does not derive from a modification or improvement of Meyerson's device; this invention apparatus teaches a new design capable of reading standardized credentials; furthermore, this application teaches an apparatus design to avoid the imaging device movement or any other manual operation to perform the reading.

The basis for a portable device for processing point of sale transactions has been addressed by Kumar (U.S. Pat. No. 5,489,773). Kumar claims the device having a plurality of components with a credit card reader, a one dimensional product barcode scanner, a printer, for printing receipts. The apparatus of this invention is specifically designed to read standardized credentials encoding, said readings cannot be performed by Kumar device, nor did Kumar intend to provide this capability. Furthermore, Kumar magstnpe reader is specifically designed to read credit cards but is not capable of reading standardized credentials: credit cards readers are two tracks capable while credentials magstripe reading requires three tracks capabilities. Kumar barcode scanning supports its intended use of scanning products identification information one dimensional barcode containing the product SKU (Stock Keeping Unit), while this application apparatus intends to support recovering credentials encoded information, being one or two dimension encoded media. Like any other portable barcode reader, Kumar device has to be manually pointed to a barcode, manually adjusting the distance between the device and the barcoded media in order to perform a successful reading of the barcoded media. The apparatus of this invention is not designed to be hand portable, is not designed to be moved in order to successfully perform a credentials reading. The apparatus design provides the instant reading capabilities since the imaging device is mounted at a focal distance causing a successful reading each time a credential is approached to the window. Major differences exist between Kumar device and the apparatus of this application: Kumar device serves the point of sale purpose, the apparatus of this invention serves a wider range of credentials information recovely; Kumar device is a hand portable device, the apparatus of this invention is not hand portable; Kumar apparatus does not connect to a host computer to provide the point of sale tasks, the apparatus of this application requires a connection to a computer system to communicate the credentials information; Kumar device must be manually handled to perform the required tasks, the apparatus of this invention is stationary and does not have to be moved, motioned, or manually operated to perform the credentials reading.

The basis for a security clearance card has been addressed by Register, JR. et al. (U.S. Pat. No. 7,137,553). However, the subject of this invention is not to set a standard for a security clearance card and therefore there exists no relation between Register, JR teaching and the system of this invention; hence Register teachings are irrelevant to the subject of this invention. Furthermore, Register's invention date of Nov. 21, 2006 is past the original application of this invention and which was filed on Dec. 30, 2002 and which this application for invention is a continuation in part. No teachings of Register can be a basis for precedence to any claim of the present invention.

The basis for an automated method for visitor clearance on a self service basis has been addressed by Burns (U.S. Pat. No. 7,136,512). Furthermore, Burns' invention date of Nov. 14, 2006 is past the original application of this invention and which was filed on Dec. 30, 2002 and which this application for invention is a continuation in part. While the subject of this invention teaches a method for admitting a visitor, which is different than the method taught by Burns, no teachings of Burns can be a basis for precedence to any claim of the present invention.

The basis for identity system consisting of a card shaped information carrier having an electronic readable memory has been addressed by Van Der Valk (U.S. Pat. No. 6,382,506). Van Der Valk teaches a method for storing personal data into a chip embedded in a card, said card becomes a personal identification card for the said person. Van der Valk teachings are into a method for generating an ID card, while this invention teaches a method for efficiently using identification cards similar to Van Der Valk claimed identity card. Therefeore, Van Der Valk teachings are not the basis for any precedence to any claim of this present invention.

BACKGROUND OF THE INVENTION

Security systems that rely on human intervention and manual data entry are prone to excessive error rates, delay in processing, high operational cost, increased inefficiencies and decreased reliability.

Nonetheless, secure facilities often require rapid data entry to support granting access for visitors, contractors, vendors, and certain categories of employees. Traditional logging methods involve a human attendant station, and either a handwritten logbook, or a software system application that requires significant manual data entry and other manual tasks to produce an access pass.

BRIEF SUMMARY OF THE INVENTION

It is an objective of this invention to provide:

1—an apparatus connected to a Processor Unit. The functional intent of this apparatus is to provide a means for automatically recovering information from standardized identification cards and processing the data through an internal processor and communicating the output to a computer system or network application. The range of use of this apparatus is to automate tasks that were previously accomplished through operator-intensive data entry.

2—It is another objective of the present invention to allow security personnel to view a continuous live video screen of the visitor arrival area using a digital camera linked to the system application and to automatically acquire an individual digital image upon presentation of an individual standardized personal identification credential to the apparatus above mentioned in item 1.

The present invention delivers a time-sensitive pass with machine-readable media and capabilities of unlimited re-use for re-entry and re-exits (in and out of the secured premises), with photo and other pertinent printed information and allows for color-coding different passes issued to visitors, suppliers, vendors, employees, and contractors. Unlimited re-use of the badge is permitted by the system while the pass is valid based on a specified allotted validity period which specifies when the pass may no longer be re-used.

The entry/exit workstations may be interconnected into a network to allow individuals who have been granted access to the facility to be recognized at any entry/exit workstation.

The present invention provides a means for pre-announcing visitors by supplying a name, a company name, the date and duration of the visit. Such pre-announcements once stored in the security database, allow the system application to automatically locate the person receiving the visitor upon presentation of the standardized personal identification credentials to the apparatus cited in item 1. The system application immediately displays this information to the workstation operator and identifies the person responsible for receiving the visitor, and which should be contacted for escorting the visitor in premises.

The present invention provides means for customizing the software application security rules and supports Advanced Encryption Standards (AES) 128-bit data encryption as a means of protecting data privacy. The application supports also the following Symmetric Cryptography algorithms: Rijndael, RC2, DES, and TripleDES.

It also incorporates critical data on known and suspected criminals, saboteurs, and terrorists (as delivered, by the US Department of Homeland Security).

In accordance with the above, the access control system application automatically collects data and builds visitor records that can be viewed at any time, automatically acquires individuals digital images, automatically checks for visitor preannouncements, automatically checks records for main or alternative employees, contractors, suppliers and vendors identification records, automatically checks suspect or criminal, terrorism status and subsequently displays a warning window, automatically prints a color-coded time-sensitive pass for the different types of persons entering the facilities, automatically detects expiration status, and disallows entry when appropriate.

DETAILED DESCRIPTION OF THE INVENTION

Description of the Apparatus

Figure 1:
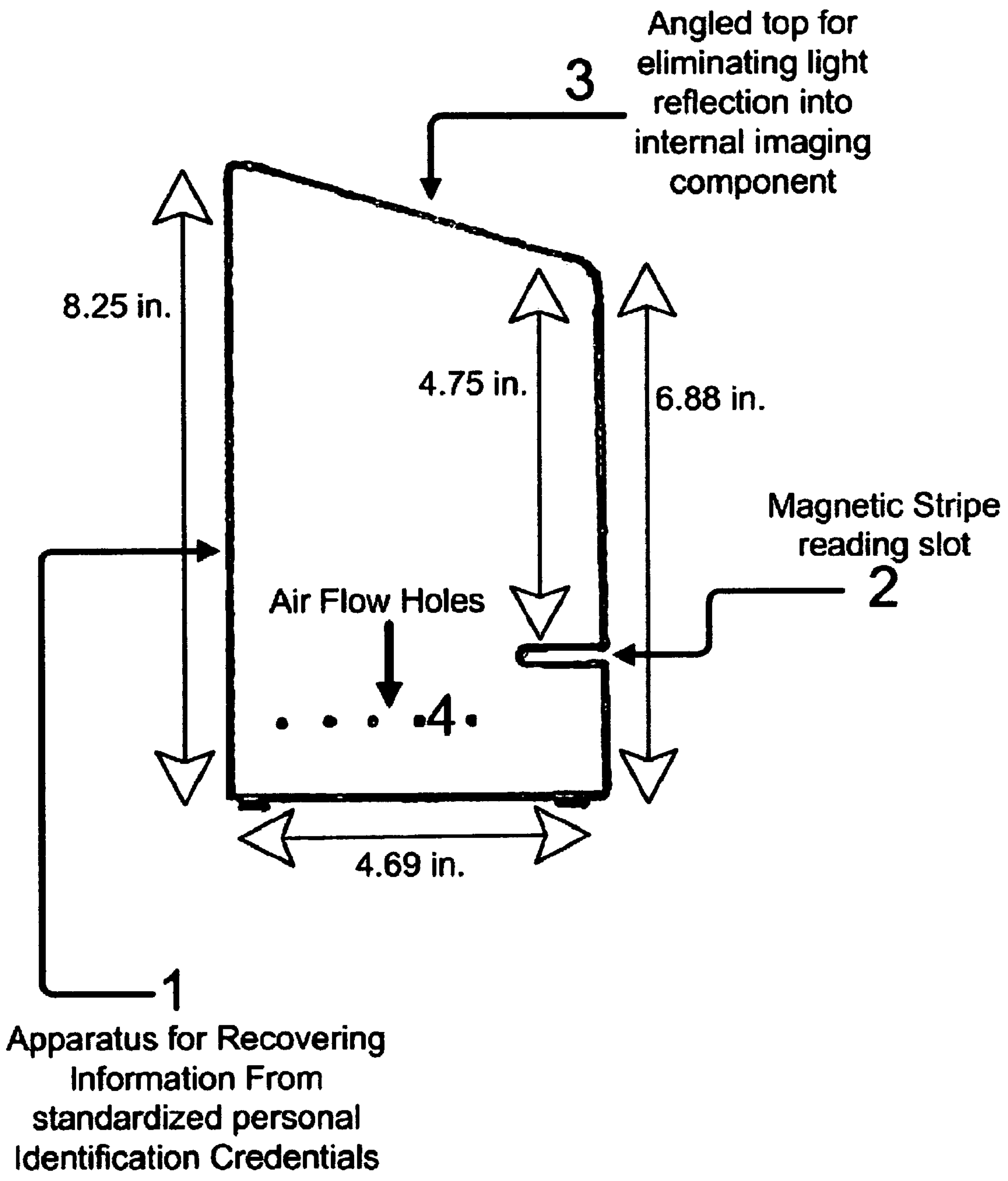
FIG. 1 is a schematic of the reader for standardized personal identification credentials.

Referring to FIG. 1, the device reader for standardized personal identification credentials apparatus housing, 1, is specifically designed to accommodate easy reading of bar-coded media form a top window 5, and magnetic stripes encoded media using a conveniently located slot 2, in the front of the unit. A series of airflow holes 4, on both sides of the unit housing, provide cooling requirements support. The dimensions of the housing are specified in FIGS. 1 and 2. These dimensions have been engineered and determined based on the reading requirements of the unit.

The structure includes an angled top window 3, designed to divert reflection of the light, emitted by an internal imaging component, to the internal walls of the housing, away from the imaging component, thus avoiding possible interference with its proper operation. The angle extent is calculated to precisely allow light reflection diversion while offering a readable view of the presented media. Furthermore, the internal walls of the unit are painted with black mat paint, in order to absorb the light reflection and avoid further reflections.

Figure 2:
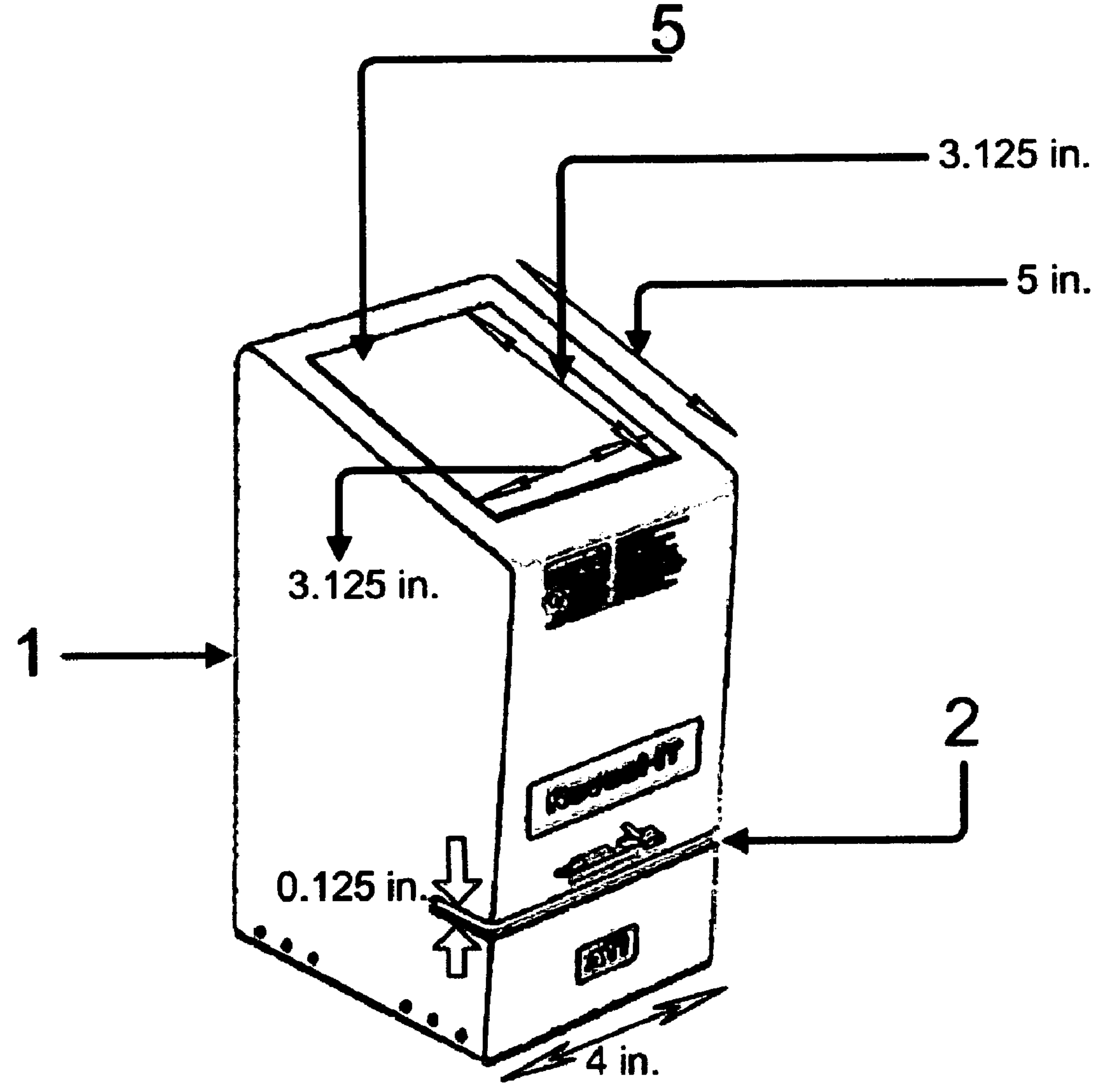
FIG. 2 is a front view of the finished housing for the reader.
Figure 3:
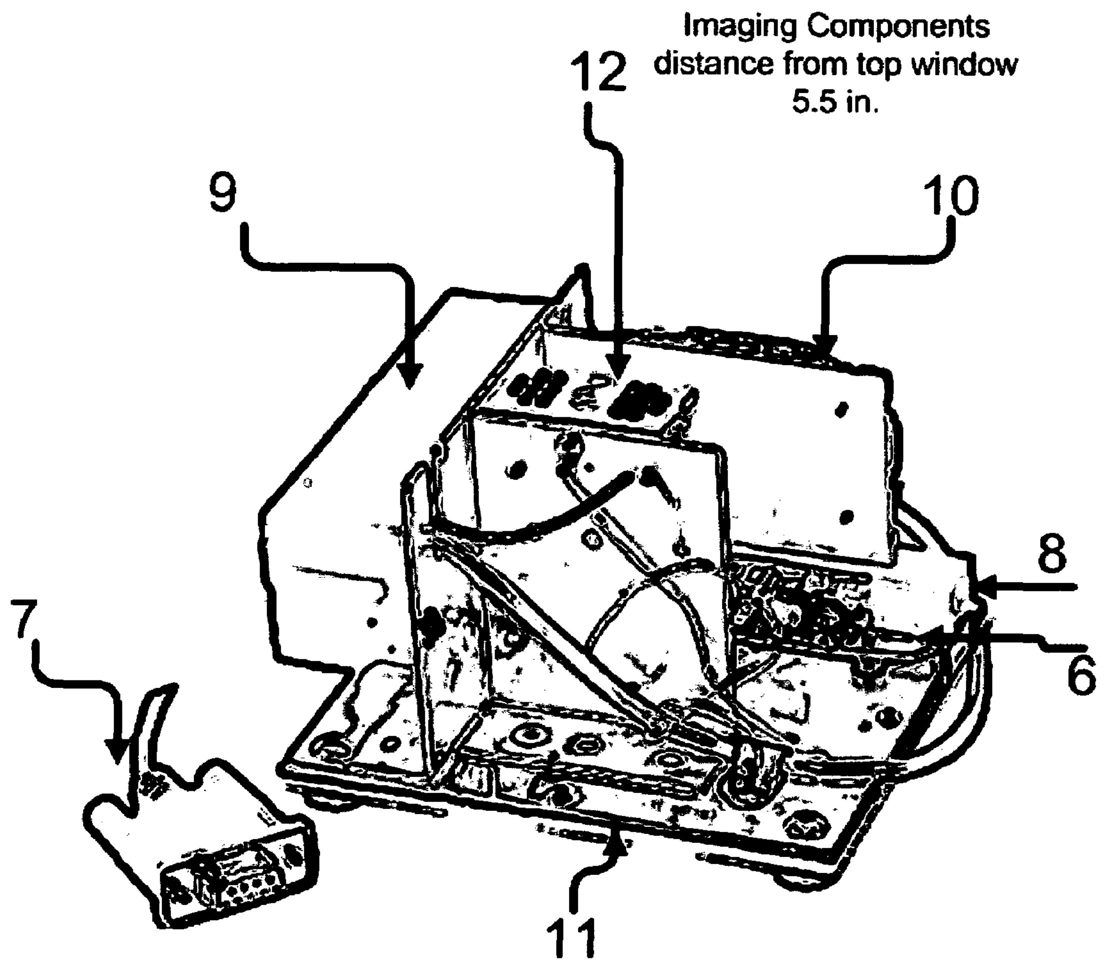
FIG. 3 is a view of the internal components of the reader for standardized personal identification credentials

Referring to FIG. 2, the reader for standardized personal identification credentials apparatus is small enough to fit onto a standard workspace, occupying a desktop area of no more than 18 square inches (116 $cm^2$). A top window, 5, facilitates recovering information from bar codes printed on the credential allowing the internal imaging device to take a digital image of the credential media when it is presented to the top window 5. A slot, 2, facilitates recovering information from magnetic stripes affixed to the credential by swiping the card through said slot. Referring to FIG. 3, the reader for standardized personal identification credentials apparatus includes a components platform, 11, to which all components are mounted, a processing unit embedded on a circuit board, 10, which controls the imaging device, 12. Furthermore, the controlling unit, 10, communicates with a computer system through industry-standard communication port, 8 as facilitated by an interface board, 6. A 3-track magnetic media reader, 9, is also attached to the housing platform, 11, and connects to a computer system communication port through a cable, 7, and is capable of reading any media encoded with a magnetic stripe standardized in general accordance with standards created and enforced by the American Association of Motor Vehicle Administrators, and credit card standards.

When connected to a computer system communication port and a 5.2 VDC, 1 A power supply, this apparatus is capable of reading any optically encoded or human-readable credential presented to the top window, and any magnetic stripe encoded media passed through the horizontal slot. No manual triggering is required.

Figure 4:
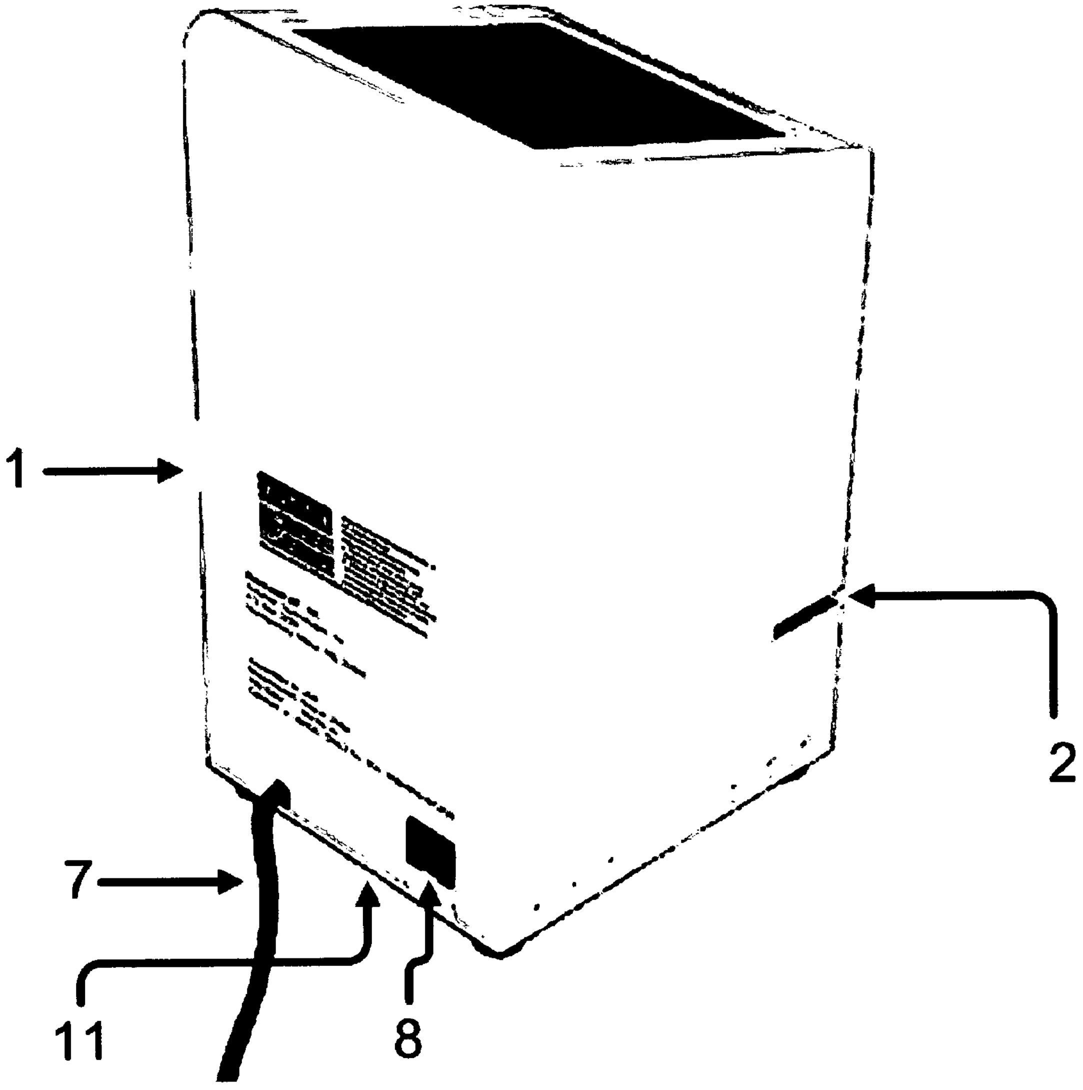
FIG. 4 is a back view of reader for standardized personal identification credentials

Referring to FIG. 4, the apparatus housing, 1, sits on the platform, 11, and is attached using metallic fasteners, with the magnetic reader cable, 7, connecting to one communication port of the computer system and the imaging assembly, which connects to a second communication port. This design makes it easy to access the interior of the device for repair and upgrades purposes.

Figure 5:
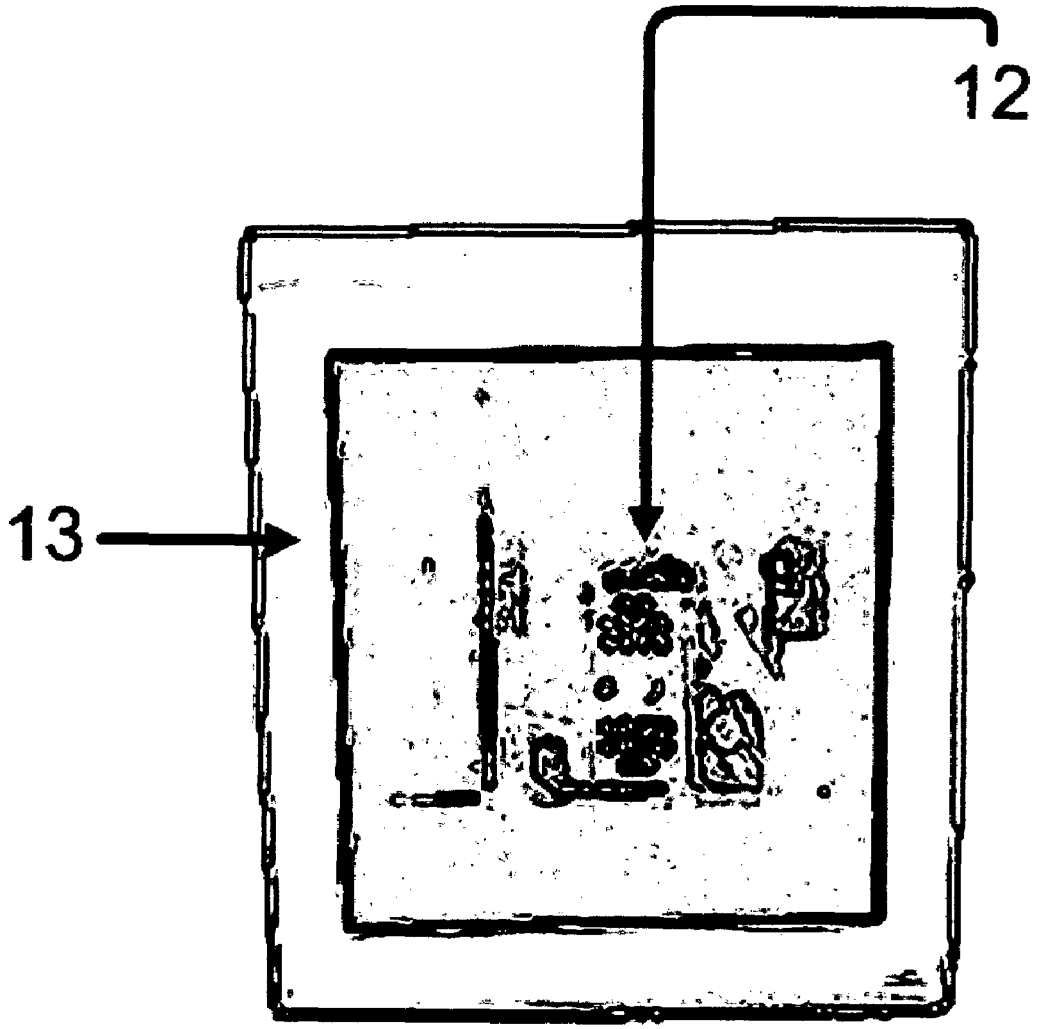
FIG. 5 is a top view of the claim 1 apparatus, reader for standardized personal identification credentials

Referring to FIG. 5, as mentioned earlier, the upper surface of the apparatus top includes a top window covered by an embedded CR39 plastic lens, 13, tinted with special Red micro tint for the purpose of reflecting outside light from entering the equipment, which may result in increased difficulty in reading medias. The internal imaging component, 12, is located under the window, at a distance of 5.5 in from the window, which was determined to be the proper distance for an optimum focus, and therefore allows for a successful media reading upon presentation of the media at the top window. The imaging component is pointed upward, and is capable of emitting a class II laser light of 1.0 mw maximum output, to illuminate the face of any credential placed on the window. The imaging component continuously emits a low-powered light beam which serves in the detection of the presence on the top window of a media to be read, therefore eliminating the need of manually triggering the unit for reading purposes, as the automatic triggering mechanism is set to cause the reading of a media presented at the top window.

This specific design eliminates the need for manipulating the-unit back and forth, as is done when using a regular hand-held barcode reading device.

The unit design is also made to specifically make it easy to read all types of barcode medias such as drivers' licenses in contrast with units designed specifically for retail outlets which are limited to reading 1D barcodes and which are designed to be embedded in a rolling belt unit, thus serving the retail particular purpose.

Description of Automated Access Control System

Figure 6:
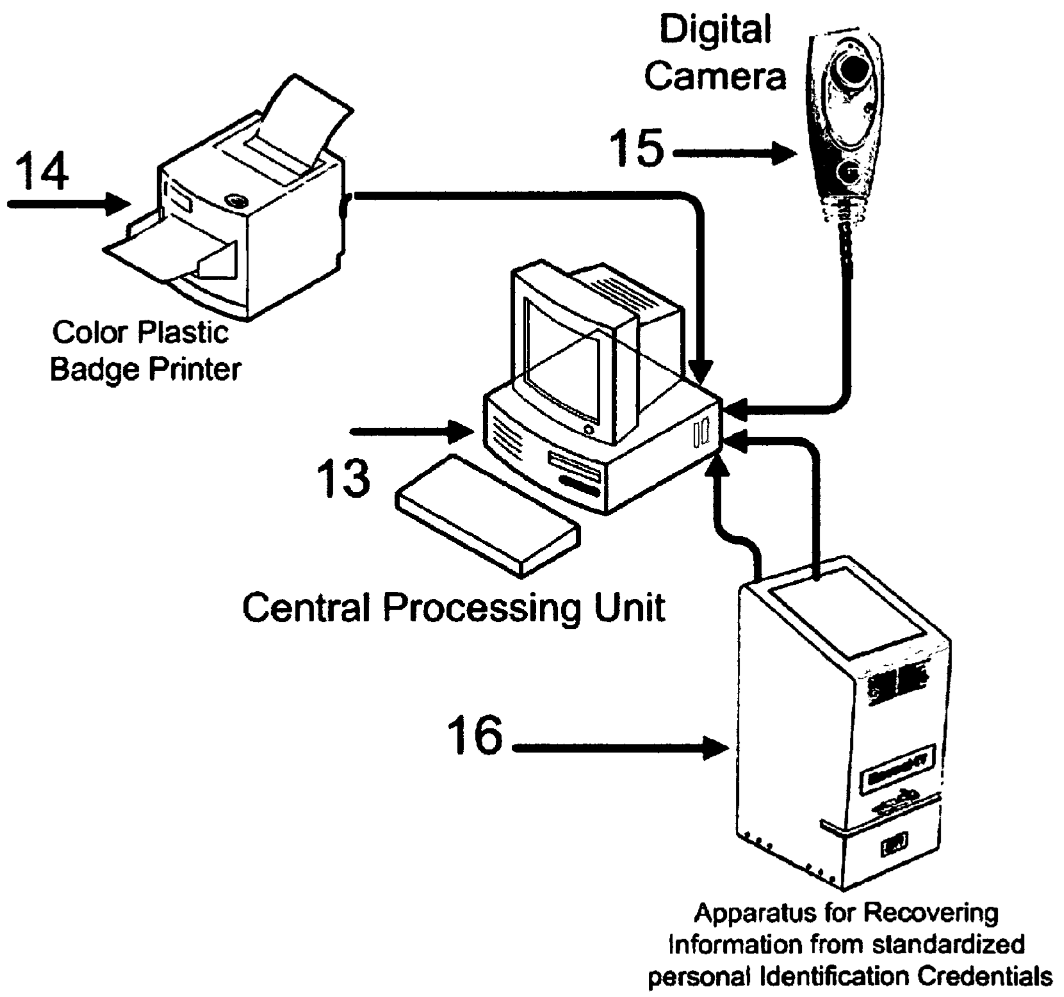
FIG. 6 is a schematic of the entry/Exit Access Control System Building block

FIG. 6 schematically illustrates the elements of an entry/exit workstation, which would be located at an attended and/or unattended lobby area. Each entry/exit access control system is composed of a reader for standardized personal identification credentials, 16, a suitable camera, 15, Central Processing Unit, 13, One Or More Color Plastic Card Printers, 14, Pointing Device, Keyboard, and Display Monitor.

Figure 9:
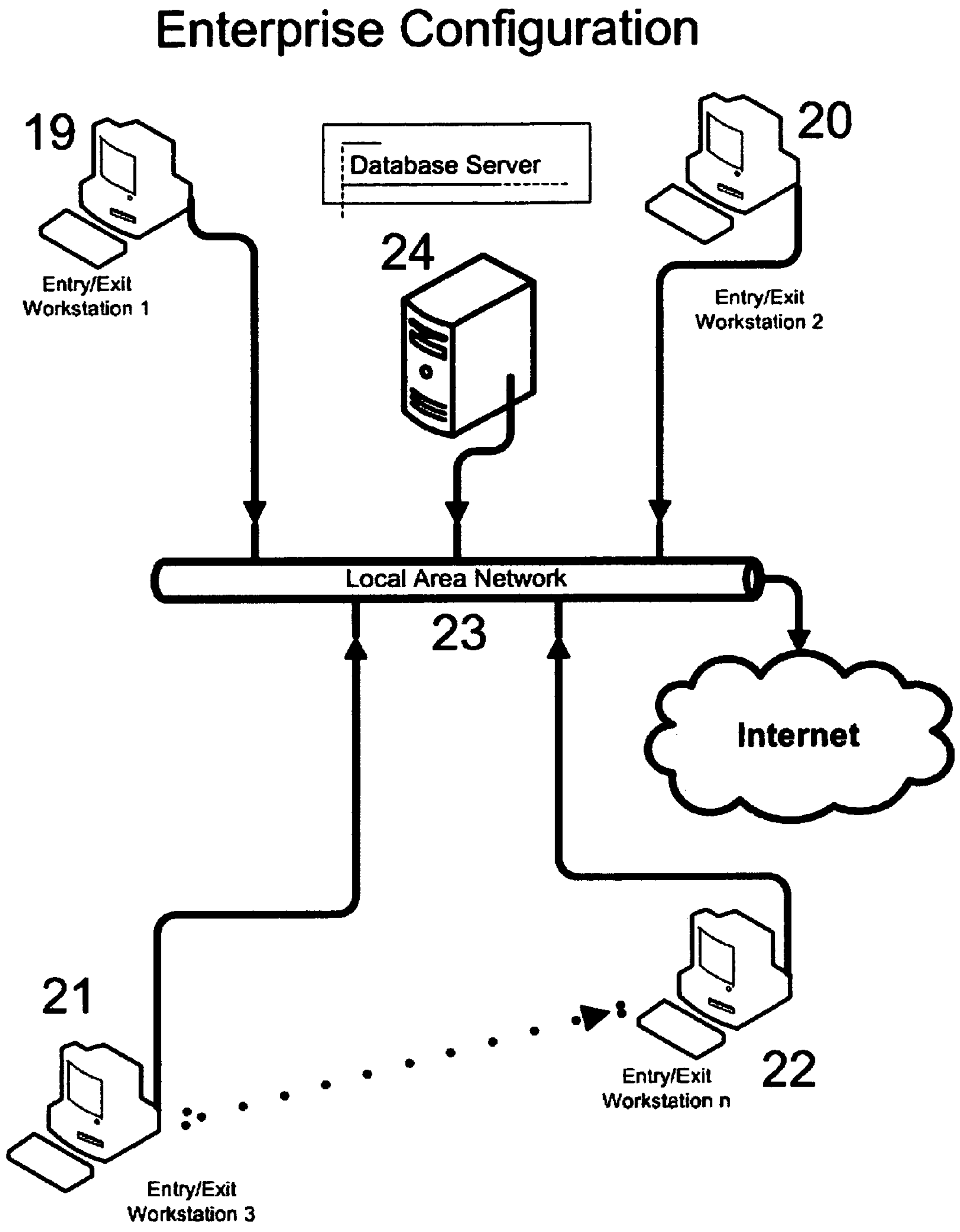
FIG. 9 is a network implementation of the software system application

FIG. 9 schematically illustrates an enterprise version of the access control system, comprising of multiple workstations, 19, 20, 21, 22, etc., interconnected in a network configuration. The enterprise version supports basic needs for larger buildings featuring multiple entry/exit portals, and campuses that require consistent and timely security precautions across multiple buildings. A large number of workstations are connected to a local area network, 23, controlled by a central database server, 24. All workstations collect and store data in the central database server. In such a network, all data is immediately available at all workstations. Such a strategy permits credentialed staff and visitors to be recognized by any workstation.

Figure 7:
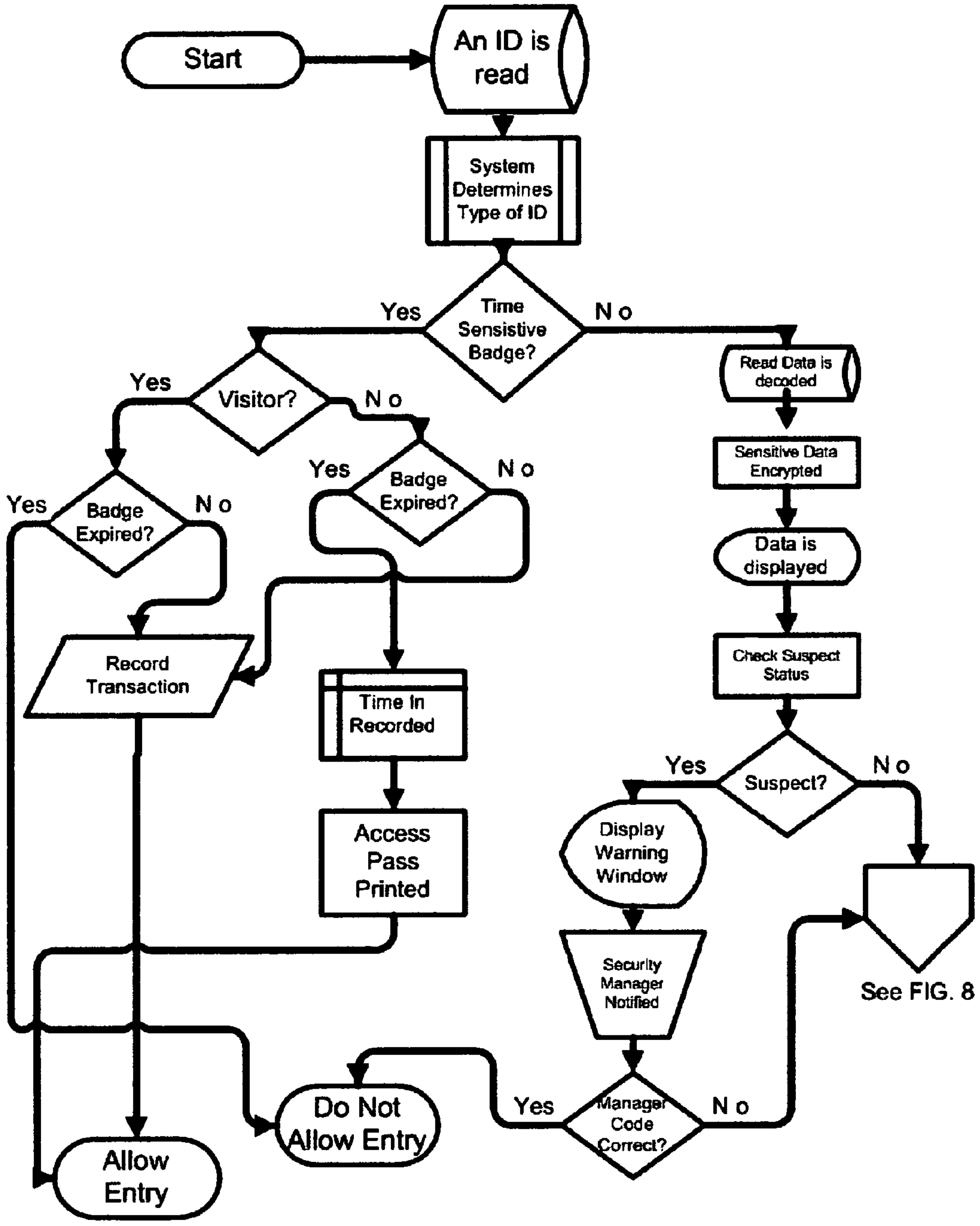
FIG. 7 is a chart of the internal dataflow of the Software System Application

Upon the arrival of an individual into a protected facility, and upon presenting the credential to the reader for standardized personal identification credentials device described in this patent application, the system automatically reacts, as illustrated in FIG. 7. In summary, the system determines whether the individual is an employee or a visitor and, if identified as a visitor, the system decodes data, and checks records.

Operation Steps through the Following Functional Sequence:

1—A credential is presented to the reading apparatus

2—If the credential being read is a time-sensitive pass originally issued by the system to either an employee or visitor, the system initiates a detection mechanism that recognizes whether or not the pass is still valid, and whether or not the individual is an employee or a visitor. If the individual is determined to be an employee using an otherwise valid pass that has expired, a new pass can be issued automatically and the employee can be requested to surrender the expired pass for destruction or disposal. If the individual is determined to be a visitor whose credential has expired, then the system could refuse to grant without completing a new registration. By default, the visitor access pass expires within 24 hours of issue time, or for the period of validation specified by the receiving host through a visitor pre-announcement utility. At exit, the pass media is read using a barcode gun, to collect a time of exit record. The pass is also used for re-entry in to the premises and re-exit, for unlimited number of times, within the specified period of validation.

3—If the credential is determined to be any of any other acceptable type, then the system decodes the encoded data and encrypts the sensitive information before displaying it on the workstation monitor for verification by the station guard.

4—The system checks database information to determine whether the individual is an employee, contractor, vendor, supplier or a visitor.

5—If an employee is recognized using the employee preselected alternative credential, the system displays the employee digital image in the image window on the workstation monitor to facilitate facial recognition by the station guard, and subsequently prints an access pass whose range of use is limited by facility policy.

6—If the individual is recognized as a visitor, then the system acquires a digital image of the individual using the built-in digital camera. Ideally, digital images acquired in this manner are displayed in the proper image window of the software application and are saved or stored in the system only if the individual is actually admitted into the facility.

7—The system checks existing records for possible record matches. If a match is found, the archived record is displayed along with the contemporaneous record (including the digital image) to facilitate visual confirmation by the station guard. This recognition process reduces the possibility that multiple individuals could use a particular credential.

8—At each credential reading, the system further checks for known and suspected criminals, saboteurs, and terrorists using lists as delivered by the US Department of Homeland Security.

9—If such checks are positive, a warning window is displayed at the entry/exit workstation, which requires the intervention of a security manager. The system would not admit the individual unless the security manager enters a unique security code to permit such admission.

Figure 8:
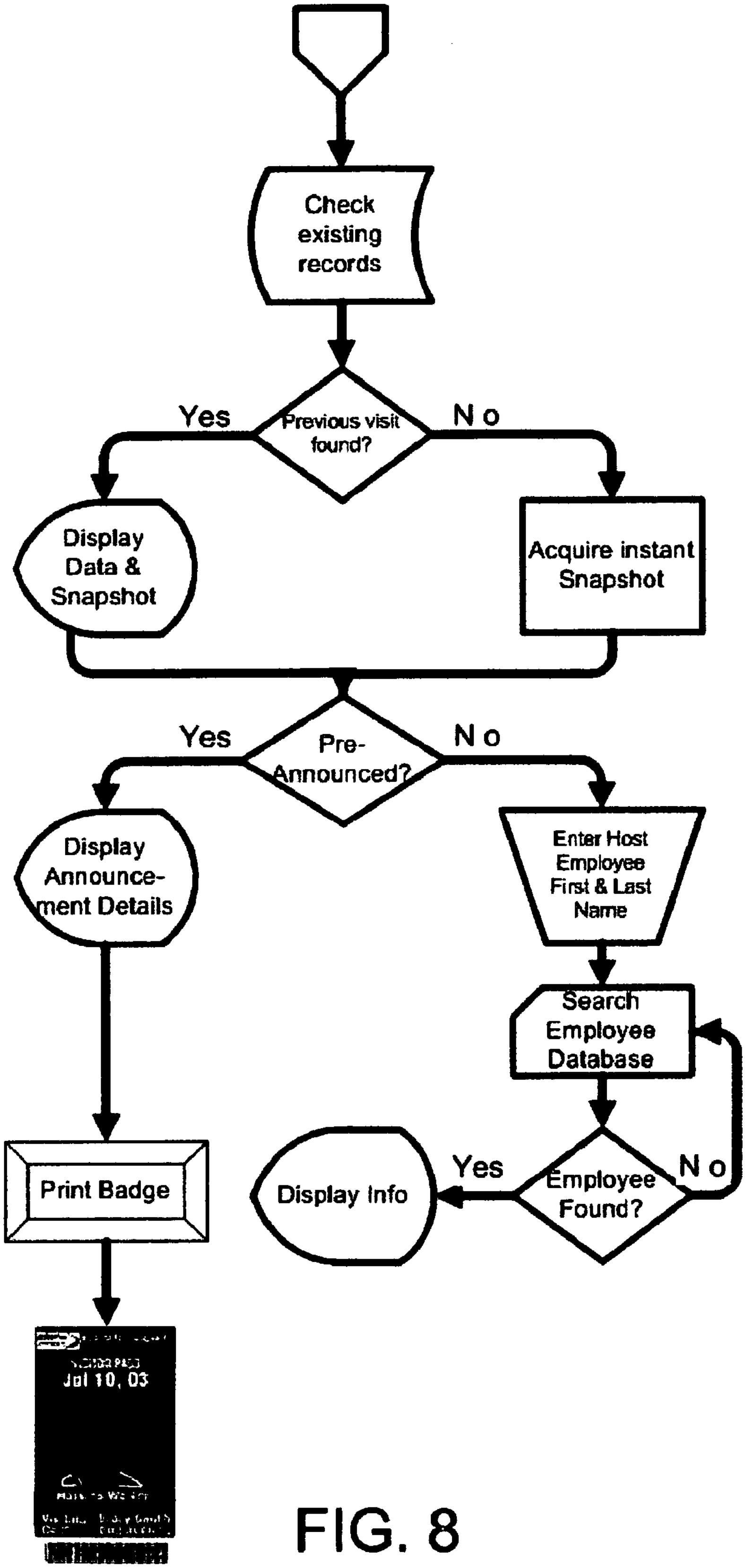
FIG. 8 is a continuation of internal dataflow from FIG. 7

10—If the checks are negative (as continued in FIG. 8), the system searches for previous visitor records. If found, the system displays an archival previous digital image of the visitor. This feature allows visual confirmation by the station guard. If no previous record exists, an individual digital image is acquired as in step 6 above.

11—If a match is found in searching through Pre-Announcement records, the system displays a window listing the host employee name and phone number, to be called for escort purposes.

12—If no pre-announcement is found, the visitor is requested to provide the host name and a quick search is performed in the employee database. The query result provides contact information needed to contact the host for escorting the visitor.

Operating Modes

Two software environments exist: Visitor Mode and Employee Mode. When the software system application starts, it is in Visitor Mode by default. In Visitor Mode, the data flows are as described above. If the software operator selects Employee Mode, the software application initiates a human resources module. Data collection is stored in an Employee Form upon reading an employee-specific credential. A second reading stores a credential identification code to define an alternative credential.

Security Settings

Each processing item in the software system application is protected by a security setting that a system administrator would implement based on an established security policy, to enable or disable the item.

Data Collection Settings

Data shown in the collection form can be customized for viewing and saving, as specified by the system administrator. Each data item can be viewed or hidden, can be saved in the system data store or ignored at the end of an admission process.

Visits Record Export

Visits data collected can be exported into a comma delimited format file.

Unlimited Printing Capabilities

Figure 10:
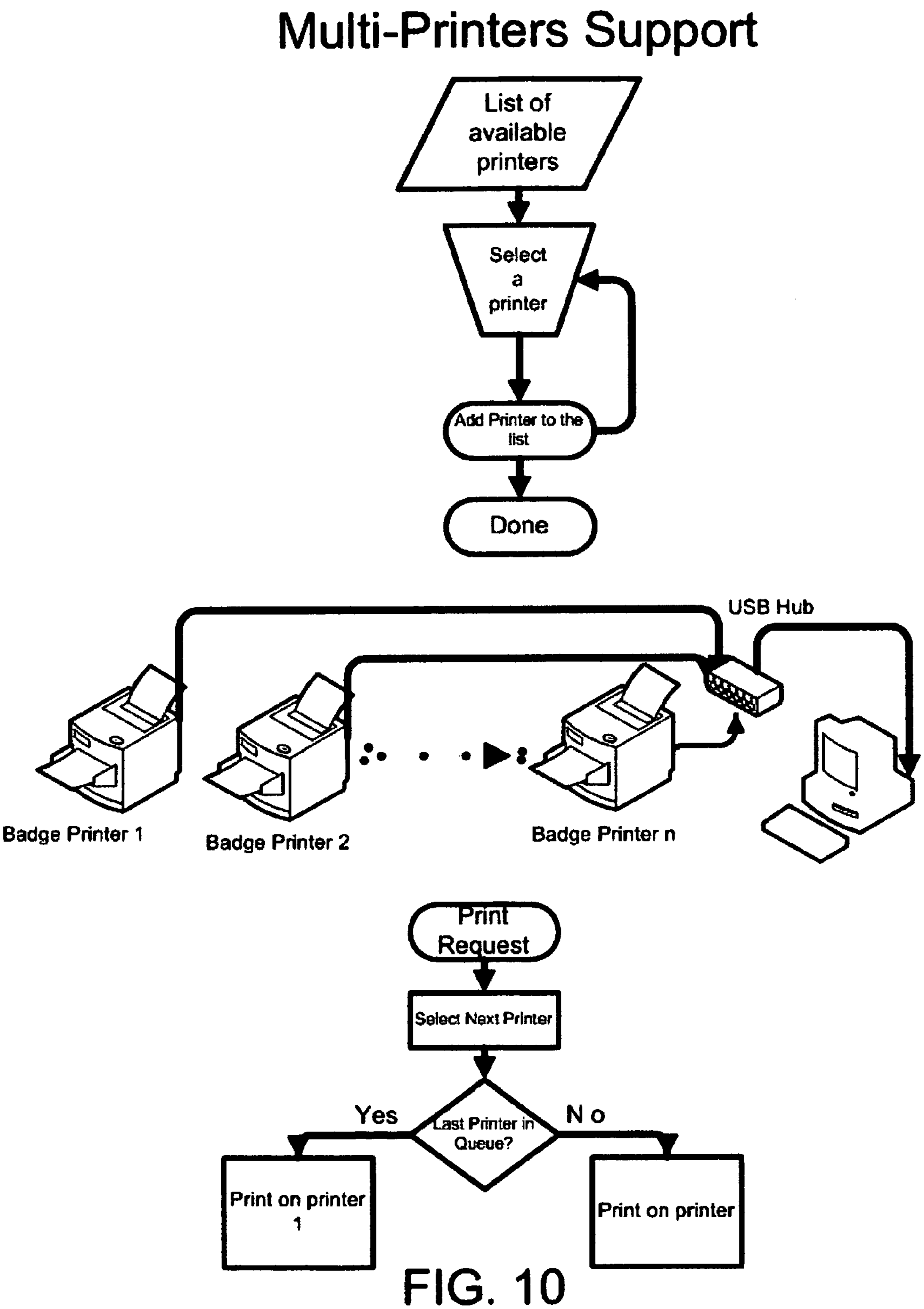
FIG. 10 is a data flow and functional schematic of the multiple printer feature of the software system application.

To reduce visitor-waiting time for the pass printing, the system can be set to print to multiple printers in parallel, in a sequential method, as illustrated in FIG. 10. Each printer is numbered 1 . . . 256 to allow easy direction for the visitor. The system sends a print job to a printer and displays a window instructing a visitor to pick up a pass at a specific printer by its assigned number. If configured properly, at any time, a printer would be available to print an access pass upon submitting a pass print job, without any further delay.

System Networking Identification

Each workstation can be given a unique identity on a network, as illustrated in FIG. 9. This identification allows a security manager to re-create a visit progression in case of a security breach. In a network configuration, multiple workstations can be interconnected through a local area network. Information collected from all workstations is stored on a database server. This information is shared between all workstations for identification of all individual passing through any workstation's gate.

Multi-Company Support

In a commercial building environment, the system supports unlimited number of tenant companies, in addition to unlimited workstations. The system can control access to the building and has the ability to manage visitors on a per company basis and issue visitor passes, customized for each company with the company logo and employee information.

Pre-Announcement Utilities

A visitor preannouncement utility is available for employees. This can be done, through the Internet or an intranet. The employee accesses the system pre-announcement utility to pre-announce a visitor, by name, date, and country of citizenship, and duration in days and hours of the visit. Subsequently, this duration becomes the period of validation of the access pass, upon pass issuance.

Figure 11:
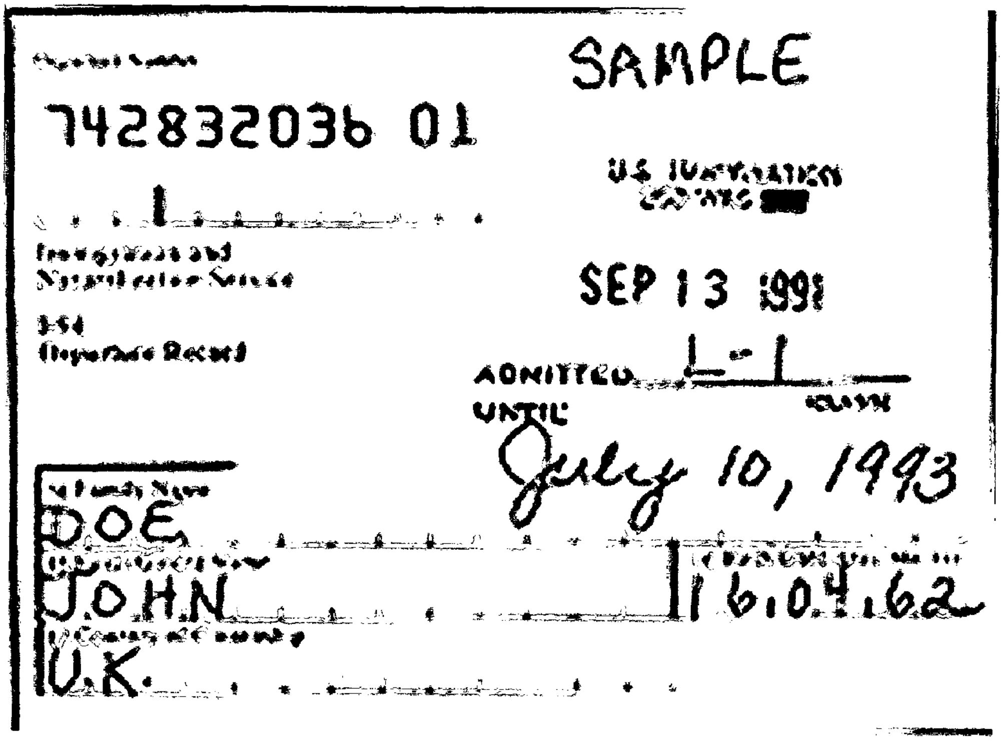
FIG. 11 is a sample US INS issued I94 form.

The system is designed to provide:

Daily reports
Weekly reports
Monthly reports
Yearly reports
Report by date
Search by name, address, or zip code, & by employee
Expired pass reports
No timeout recorded reports The system collects:

Name
Address Line1
Address Line 2
City
State
Zip
Country
Person or department to visit
ID Type
Gender
Weight
DOB encrypted using AES 128-bit
Height
ID number encrypted using AES 128-bit
Time In
Time Out International Visitor Support For international visitors, the system captures a digital image of the US Immigration and Naturalization Services form I94 (FIG. 11) issued at the port of entry, to every visitor entering the US. Information read from form I94 includes:

First Name
Last Name
DOB
I94 Number
Country of Citizenship of origin

This process allows the system to automate security services associated with foreign visitor entry/exit.

The use of I94 as an identification document overcomes the limitation of using a passport as an identification document. When a foreign visitor enters the US, an I94 form is issued and has the potential of being used as a standardized form of ID, for all foreign subjects. On the other hand, passports are issued by each country's authority, in the country's national language, and do not abide to any international standard. Therefore, passports cannot be used to extract information easily and therefore cannot serve as a means of automating an access control system. That is where the passport limitation is. The passport can still be used in any manually operated access control system.

Airport Sterile Area Access Control

A customized version of the system can be used to control non-travelers access into an airport sterile area (boarding areas), beyond a security checkpoint. The system used for issuing entry passes to the sterile areas is located away from the sterile areas security checkpoints, in a "Visitors Security Center" (VSC) area. Airport visitors stop by the VSC to obtain an entry pass using a drivers' license or any other acceptable means of identification. The system instantly checks backgrounds and make a decision of whether a pass may be printed. System flags suspicious individual seeking entry and immediately alert security officer of this intrusion attempt.

Security checkpoint is equipped with a barcode scanner. Checkpoint security guard reads the pass printed bar-coded media, and upon authentication, the visitor record is displayed on a monitor including the visitor digital image acquired earlier at the visitor center. Security guard performs a visual security check before admitting the visitor for further security checks.

At exit, visitor pass is read to record the exit and end of that entry transaction. Passes may be re-used for re-entry within the 24 hours, following the time of issuance of the pass.

Vehicle Access Control into Secured Areas

Another customized version of this patent application access control system is used to control vehicle access into a secure area, such as airport runways. At point of entry, the system automatically collects individual information from all vehicle passengers drivers' licenses, vehicle registration document, checks passengers backgrounds, issue passes and a large vehicle pass containing information such as vehicle description and destination, vehicle passengers name, the objective of the entry, date and time of entry, entry duration, and a barcode media used to easily locate entry records. The vehicle pass is posted on the vehicle window so that it is easily accessed and read.

At any time, while the vehicle is on premises, area police, or otherwise area security personnel, is able to read the bar-coded vehicle pass, using a barcode scanner. This process increases greatly secured areas security while keeping detailed records of all entries and exits to and from the secured premises.

What is claimed:

1. An apparatus for recovering information from standardized personal identification credentials, said credentials include one of drivers' licenses, credit cards, personalized store cards, company cards, and standardized identification cards issued by federal, state and local government agencies, such apparatus being structurally designed with an angled top window, black internal walls, and an imaging component, which is set at a predetermined distance from the top window for the purpose of providing the ability to read encoded media while a slot in the front allows for swiping magnetic stripe media, whereas apparatus can be connected to a computer system as a separate unit or as part of an embedded system and serving as an input means to any software application that is capable of reading such information, and wherein the barcode reading is automatically triggered upon presentation of a standardized credential to apparatus top window, and whereas "credential present" detection mechanism is performed using a continuously emitted low-powered light beam, pointed upward towards the top window.

2. An automated system configuration to control the entry/exit of individuals at a facility, comprising:

an apparatus for recovering information from standardized personal identification credentials, said credentials include drivers' licenses, credit cards, personalized store cards, company cards, and standardized identification cards issued by federal, state and local government agencies;

a computer system as a processing means;

a software application systems;

a digital camera; and a pass printer;

wherein the software application system processes the data read by an apparatus for recovering information from standardized personal identification credentials, upon presentation of the credential on top of the apparatus or by sliding the magnetic stripe credential through the apparatus front slot, and whereas upon this reading, the following processing is performed:

existing records, are checked, searching for the credential collected information match;

individual suspicious status is checked, against a security list stored in the system database;

visitor pre-announcements records are searched to find a matching announcement for the individual;

employee records are checked to determine if the individual is an employee;

the type of entry, visitor, employee, contractor, supplier, or vendor, is determined; and admission is processed as entry or re-entry of the individuals, wherein the software system application operates in two modes: Visitor Mode to process all individuals entering the facilities, and Employee Mode, whereas employees identification cards are read and stored, and digital images are acquired.

wherein the software system application causes the printing of a time sensitive access pass that includes an individual digital image, date of arrival, employee being visited, company name and logo, employee department and a time sensitive bar-code, wherein the software system application uses a NIST-certified advanced Encryption Standard, or supported symmetric cryptography, to encrypt/decrypt personal data in order to protect individual privacy, wherein the system is fully customizable and all processing tasks follow a certain security policy established by a system administrator, wherein entry/exit of international visitors is supported through reading of INS form I94 wherein the system workstation can be standalone with all data collected and stored locally, or otherwise connected to a local area network or an intranet, with support to a plurality of workstations, and with data stored in a central database server, allowing individual access passes to be recognized at any entry/exit in the facility, which is equipped with a workstation, wherein the system includes a process involving the printing of time-sensitive barcodes onto an access pass wherein, upon reading of the pass barcode, the system determines continued pass validity automatically, rendering the pass invalid upon expiration of the predetermined validation period while allowing for multiple entry/exits during the validation period, wherein pre-announcement of the visitor includes a mechanism for establishing the duration of the visit, which subsequently becomes the period of validation upon issuance of the access pass, whereas up to 256 printers can be used in a queue loop form to print passes, avoiding passes printing congestion in a high traffic area, wherein software system application automatically displays a warning window and requires the intervention of a security manager if an individual is checked suspect after a previous visit, or an individual name is on terrorists or criminals lists, or an individual name is on a NO-ENTRY ALLOWED list prepared internally.

3. The system of claim 2, wherein the software system application accepts two different types of employee credentials and wherein one credential is selected as the main credential and the second is selected as the alternative credential, labeled as the "Alternative ID", to be used when the employee loses or misplaces a regular company credential, whereas the software system application reads the credential and displays employee records, including displaying employee digital image for verification purposes and further prints a temporary pass to be used for entry and exit.

4. The system of claim 2 whereas the system supports multiple companies in a commercial building, and whereas each visitor printed pass is automatically customized for each company.

* * * * *